United States Patent
Kuo et al.

(10) Patent No.: US 11,460,133 B2
(45) Date of Patent: Oct. 4, 2022

(54) TUBE CONNECTOR

(71) Applicants: Hsin Cheng Kuo, Taipei (TW); Hung Cheng Kuo, Taipei (TW)

(72) Inventors: Hsin Cheng Kuo, Taipei (TW); Hung Cheng Kuo, Taipei (TW)

( * ) Notice: Subject to any disclaimer, the term of this patent is extended or adjusted under 35 U.S.C. 154(b) by 232 days.

(21) Appl. No.: 17/003,261

(22) Filed: Aug. 26, 2020

(65) Prior Publication Data
US 2021/0199221 A1    Jul. 1, 2021

(30) Foreign Application Priority Data

Dec. 26, 2019 (TW) ................................ 108147909
Feb. 11, 2020 (TW) ................................ 109104166

(51) Int. Cl.
*F16L 37/091* (2006.01)
*F16L 19/08* (2006.01)
*F16L 23/18* (2006.01)

(52) U.S. Cl.
CPC .............. *F16L 37/091* (2013.01); *F16L 19/08* (2013.01); *F16L 23/18* (2013.01)

(58) Field of Classification Search
CPC ....... F16L 19/08; F16L 19/083; F16L 19/086; F16L 23/18; F16L 2201/80; F16L 55/115; F16L 37/091; F16L 37/092; F16L 37/0925
USPC ................................................ 285/901, 340
See application file for complete search history.

(56) References Cited

U.S. PATENT DOCUMENTS

| | | | | |
|---|---|---|---|---|
| 4,953,898 A | * | 9/1990 | Jorgensen ............. | F16L 37/091 285/340 |
| 7,878,554 B2 | * | 2/2011 | Le Bars .............. | F16L 37/0915 285/321 |
| 8,424,179 B2 | * | 4/2013 | Webb .................. | F16L 37/0915 72/409.14 |
| 9,611,970 B2 | * | 4/2017 | Spears ................ | F16L 55/1157 |
| 10,969,047 B1 | * | 4/2021 | Crompton ............. | F16L 19/086 |
| 11,204,118 B2 | * | 12/2021 | Cardinale ........... | F16L 37/0915 |
| 2002/0158466 A1 | * | 10/2002 | Jones .................... | F16L 37/091 285/104 |

(Continued)

FOREIGN PATENT DOCUMENTS

| | | |
|---|---|---|
| CN | 102788212 A | 11/2012 |
| ES | 2207468 T3 | 6/2004 |

(Continued)

*Primary Examiner* — Aaron M Dunwoody
(74) *Attorney, Agent, or Firm* — Bradley J. Thorson; DeWitt LLP

(57) ABSTRACT

A tube connector has a main body, a restricting element, and a sealing ring. The main body has a mounting segment extending outwardly and transversely to form an inner annular space to accommodate the restricting element and the sealing ring. When the tube body is inserted, the tube body will be engaged and positioned by teeth of the restricting element. The sealing ring and the restricting element abut each other to maintain the sealing from the sealing ring. The changes of the pressure from the fluid transporting in the tube body will move the tube body and the main body relatively to and fro, and thus the abutting force against the sealing ring will increase or decrease accordingly, which maintains the elasticity of the sealing ring to maintain the sealing after a long time of use, thereby avoiding elastic fatigue and prolonging the lifespan.

12 Claims, 11 Drawing Sheets

(56) References Cited

U.S. PATENT DOCUMENTS

| | | | | |
|---|---|---|---|---|
| 2004/0036278 A1* | 2/2004 | Erdmann | ............... | F16L 37/091 |
| | | | | 285/136.1 |
| 2005/0001428 A1* | 1/2005 | Scherrer | ............... | F16L 21/005 |
| | | | | 285/420 |
| 2007/0075542 A1* | 4/2007 | Glaze | ...................... | F16L 25/01 |
| | | | | 285/322 |
| 2008/0238088 A1* | 10/2008 | Webb | ...................... | B25B 27/10 |
| | | | | 285/39 |
| 2008/0309081 A1* | 12/2008 | De Wilde | ............. | F16L 37/091 |
| | | | | 285/340 |
| 2009/0001712 A1* | 1/2009 | Webb | .................... | F16L 37/091 |
| | | | | 285/55 |

FOREIGN PATENT DOCUMENTS

| | | | | |
|---|---|---|---|---|
| TW | 201920872 A | 6/2019 | | |
| WO | WO-2005114031 A2 * | 12/2005 | .......... | F16L 37/0915 |

\* cited by examiner

TUBE CONNECTOR

BACKGROUND OF THE INVENTION

1. Field of the Invention

The present invention relates to a tube connector that can connect two tube bodies or can seal an end of a tube body.

2. Description of the Prior Arts

A tube connector is used in a tube system for transferring fluid. In the tube system, multiple tube bodies are connected to each other or ends of some of the tube bodies are sealed depending on the tube design, and thus the fluid can flow in the tube system.

With reference to FIG. 11, the tube connector has a hollow main body 50, which has at least one opening for mounting one single tube body or connecting two tube bodies. The main body 50 further has an annular seat 501 and a fixing segment 502 concaved in the opening. A sealing ring 51 is mounted in and abuts the annular seat 501. An abutting ring 55 is mounted in an assembling ring 54. A restricting element 53 is mounted in a sealing element 52. When the assembling element 54 is mounted in the fixing segment 502 of the main body 50, the sealing element 52 abuts against the sealing ring 51. When in use, the tube body 60 is inserted into the main body 50 and positioned. At this time, the tube body 60 is engaged by teeth of the restricting element 53 and thus is positioned, thereby finishing the assembling of the tube connector and the tube body 60.

In the conventional tube connector, the sealing ring 51 is abutted by the sealing element 52 and thus cannot be moved. Besides, the tube body 60 is engaged and positioned by the restricting element 53, such that the tube body 60 and the tube connector cannot be moved relatively for a long time. Therefore, the sealing ring 51, which is located among the annular seat 501, the sealing element 52 and the tube body 60, is always under an external force. As a result, after in use for a period of time, the sealing ring 51 may get elastic fatigue, which weakens the sealing between the tube connector and the tube body, and may cause leakage.

Furthermore, when the tube body 60 is manufactured, an exact outer diameter of the tube body 60 may be larger or smaller than the marked size in a certain tolerance. Therefore, when the tube body 60 is inserted into the main body 50, the tube body 60 with the outer diameter larger or smaller than the marked size will make the teeth of the restricting element 53 bent at different angles, which results in different engaging forces from the teeth. Thus, the teeth may not firmly engage the tube body 60.

Lastly, the conventional tube connector is composed of too many components for installation with the tube body, such that the structure is too complicated and the cost is too high.

To overcome the shortcomings, the present invention provides a tube connector to mitigate or obviate the aforementioned problems.

SUMMARY OF THE INVENTION

The main objective of the present invention is to provide a tube connector having an altered inner annular space in the main body to accommodate a restricting element and a sealing ring. Thus, when the tube body is engaged in the restricting element, the tube body is slightly movable relative to the main body due to changes of the water pressure, so that the restricting element abuts the sealing ring to and fro, thereby avoiding elastic fatigue of the sealing ring to maintain the sealing between the tube connector and the tube body. Furthermore, the restricting element has multiple first restricting teeth and multiple second restricting teeth of different lengths, so that so long as the exact outer diameter of the tube body lies within the range of the tolerance, the restricting teeth of different lengths still can engage an outer surface of the tube body to enhance the fixing ability.

The tube connector for sealing one single tube body has a main body, a restricting element, and a sealing ring. The main body is hollow and has two ends opposite to each other. One of the two ends of the main body forms an opening, and the other end of the main body is a sealing end. The main body further has a mounting segment being adjacent to the opening. The mounting segment extends outwardly and transversely to form an inner annular space inside of the mounting segment. The inner annular space communicates with the opening, and has an annular surrounding wall, a first abutting surface, and a second abutting surface. The first abutting surface is connected to one of two sides of the annular surrounding wall, is annular, and surrounds the opening. The second abutting surface is connected to the other side of the annular surrounding wall and is annular. The restricting element is a hollow and annular sheet, is mounted in the inner annular space of the mounting segment, and has an annular segment and multiple teeth. The annular segment abuts the second abutting surface. The teeth protrude from an inner edge of the annular segment, and are annularly spaced apart from each other. The sealing ring is hollow, is mounted in the inner annular space of the mounting segment, and abuts between the first abutting surface and the annular segment of the restricting element.

The tube connector for connecting two tube bodies is similar to the abovementioned tube connector but has two restricting elements and two sealing rings, and the main body has two openings and two mounting segments.

When the tube body is inserted into the main body, the tube body will be engaged and positioned by the teeth of the restricting element. Inside of the inner annular space, the sealing ring and the restricting element abut each other to maintain the sealing from the sealing ring. Changes of the pressure from the fluid transporting in the tube body will move the tube body and the main body relatively to and fro, and thus the abutting force of the annular segment of the restricting element against the sealing ring will increase or decrease accordingly to and fro. Therefore, the sealing ring is under an abutting force changing to and fro, so that the sealing ring is tightly abutted or loosened to and fro, which maintains the elasticity of the sealing ring to maintain the sealing after a long time of use, thereby avoiding elastic fatigue and prolonging the lifespan.

To be specific, when the inner pressure inside of the tube body is larger, the pressure will generate larger pushing force in the annular segment of the restricting element to push the sealing ring, thereby enhancing the sealing from the sealing ring and increasing the assembling strength between the tube body and the main body.

Furthermore, as long as the exact outer diameter of the tube body lies within the range of the tolerance, the first restricting teeth and the second restricting teeth of the restricting element can abut an outer surface of the tube body to engage and position the tube body since the restricting teeth have multiple different lengths, thereby enhancing the fixing between the tube body and the present invention.

Lastly, the present invention is composed of less components, and thus cost less and is convenient in assembly with the tube body.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
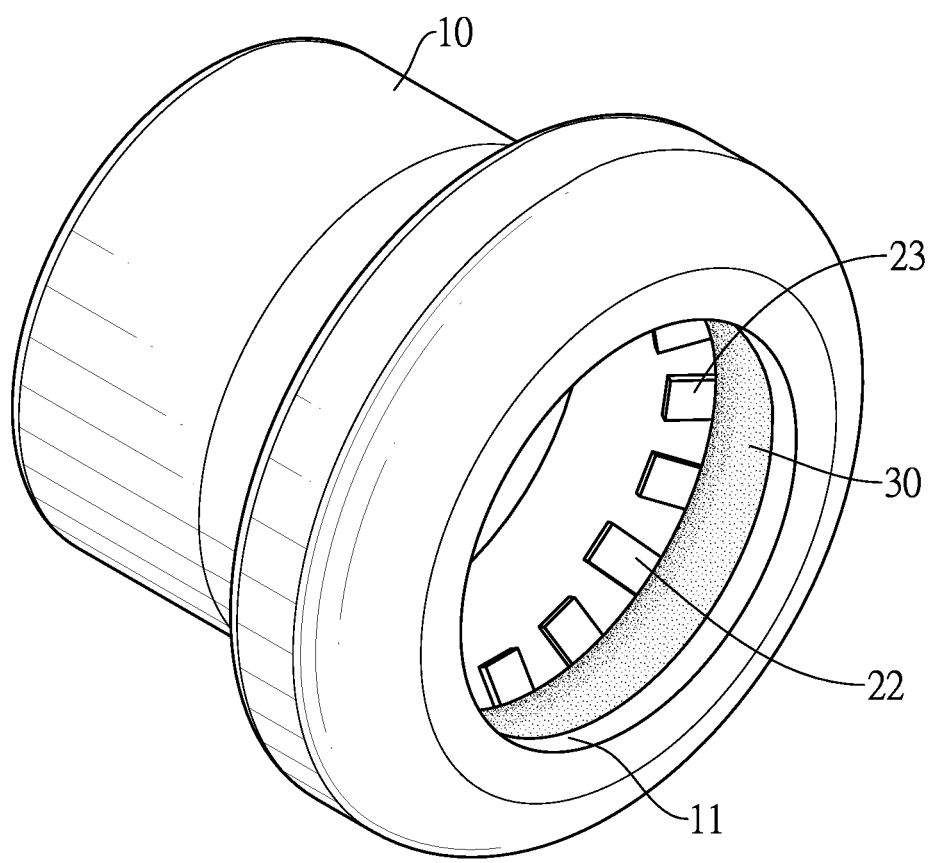
FIG. 1 is a perspective view of a first embodiment of a tube connector in accordance with the present invention.
Figure 2:
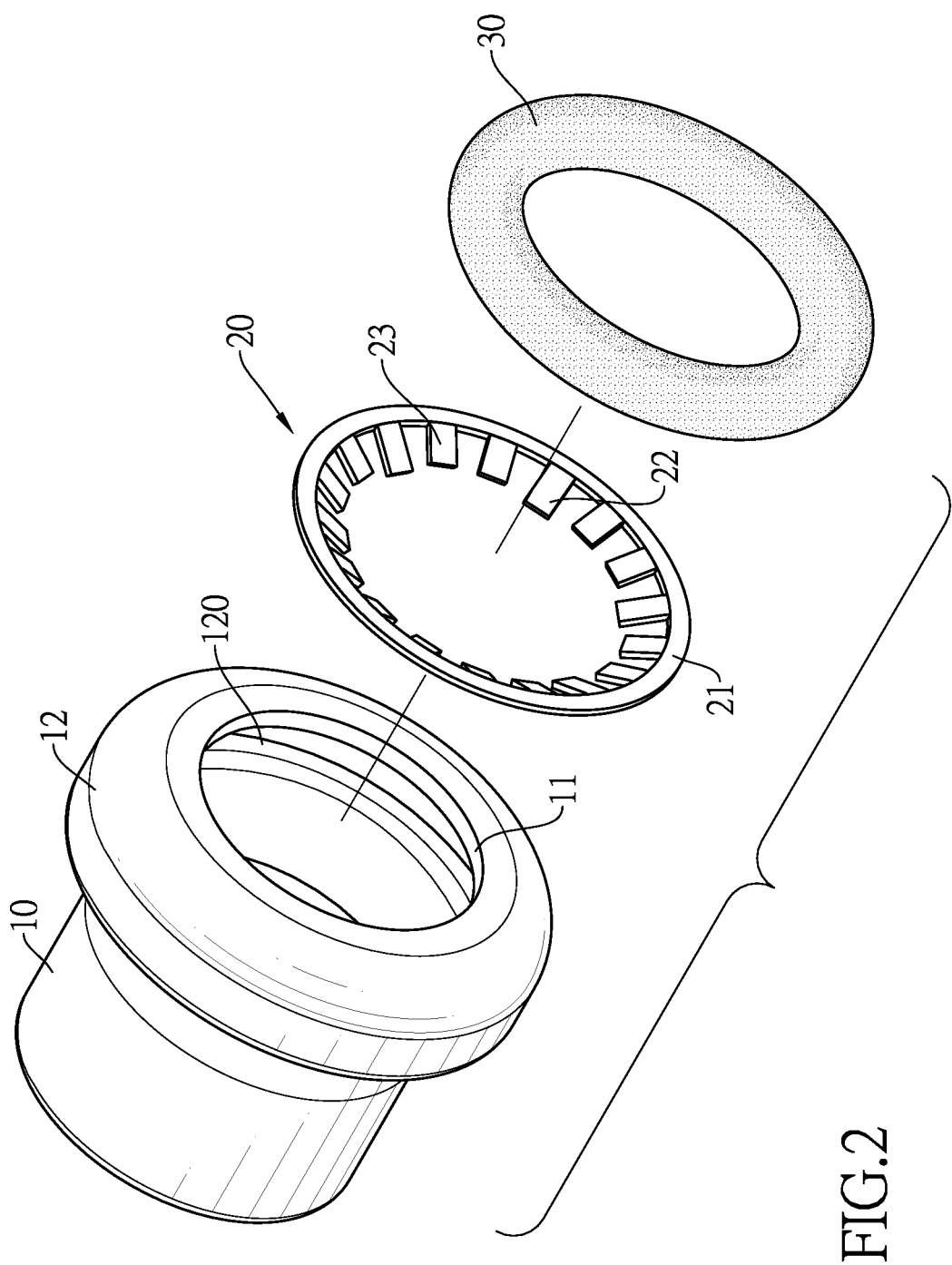
FIG. 2 is an exploded perspective view of the tube connector in FIG. 1.

With reference to FIGS. 1 to 5, a first embodiment of a tube connector in accordance with the present invention comprises a main body 10, a restricting element 20 and a sealing ring 30.

In a preferred embodiment, the main body 10 is hollow and has two ends opposite to each other. One of the two ends has an opening 11, and the other end is a sealing end. The main body 10 has a mounting segment 12 adjacent to the opening 11. The mounting segment 12 extends outwardly and transversely to form an inner annular space 120 inside of the mounting segment 12. The inner annular space 120 communicates with the opening 11 and an inner side of the main body 10. The inner annular space 120 has an annular surrounding wall, a first abutting surface 121, and a second abutting surface 122. The first abutting surface 121 and the second abutting surface 122 are connected to two sides of the annular surrounding wall respectively. Both the first abutting surface 121 and the second abutting surface 122 are annular. The first abutting surface 121 surrounds the opening 11.

The restricting element 20 is a hollow and annular sheet and is mounted in the inner annular space 120 of the mounting segment 12. The restricting element 20 has an annular segment 21, and the annular segment 21 abuts the second abutting surface 122. The annular segment 21 has multiple teeth protruding from an inner edge of the annular segment 21. The teeth are annularly spaced apart from each other. In a preferred embodiment, the teeth include multiple first restricting teeth 22 and multiple second restricting teeth 23.

Figure 4:
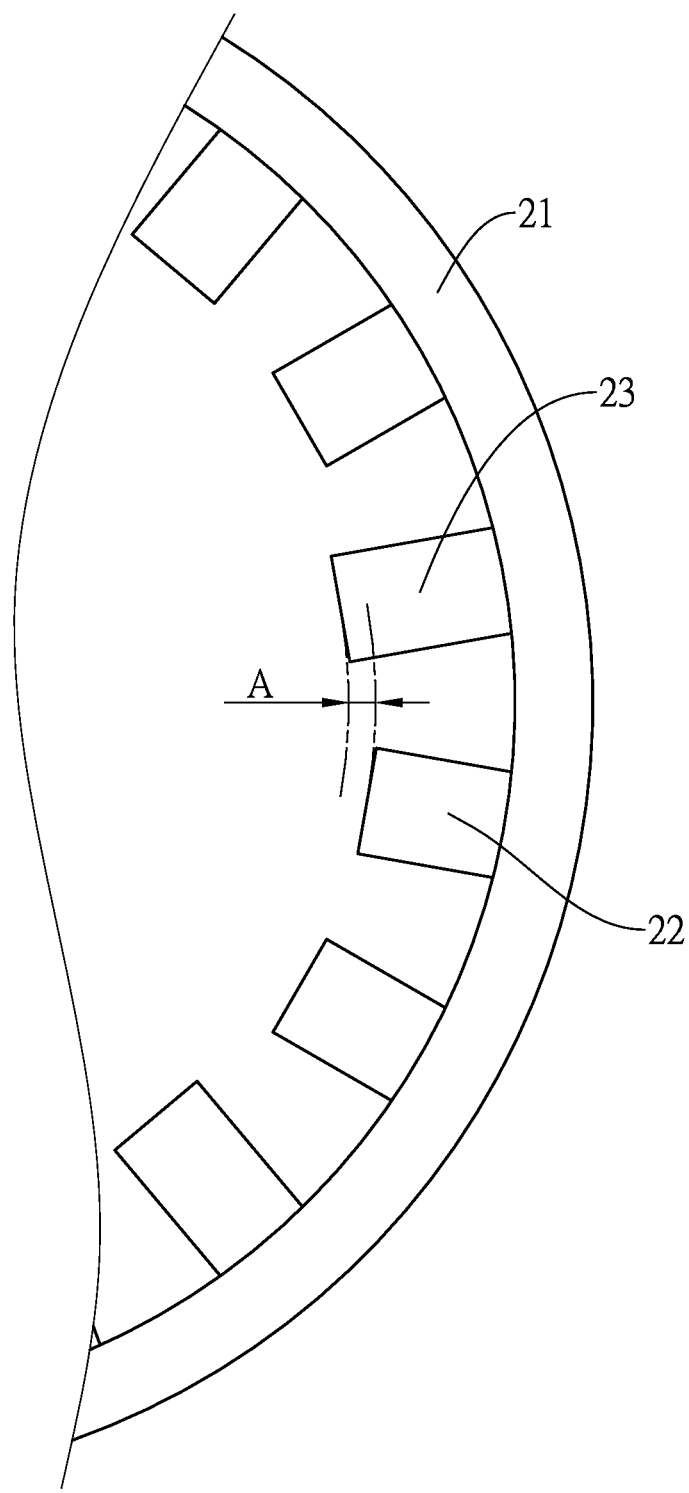
FIG. 4 is an enlarged view of FIG. 3.

As shown in the enlarged view of FIG. 4, a protruding distance from the annular segment 21 of the first restricting teeth 22 is larger than a protruding distance from the annular segment 21 of the second restricting teeth 23. A difference between said protruding distance of the first restricting teeth 22 and said protruding distance of the second restricting teeth 23 is a distance A.

Figure 3:
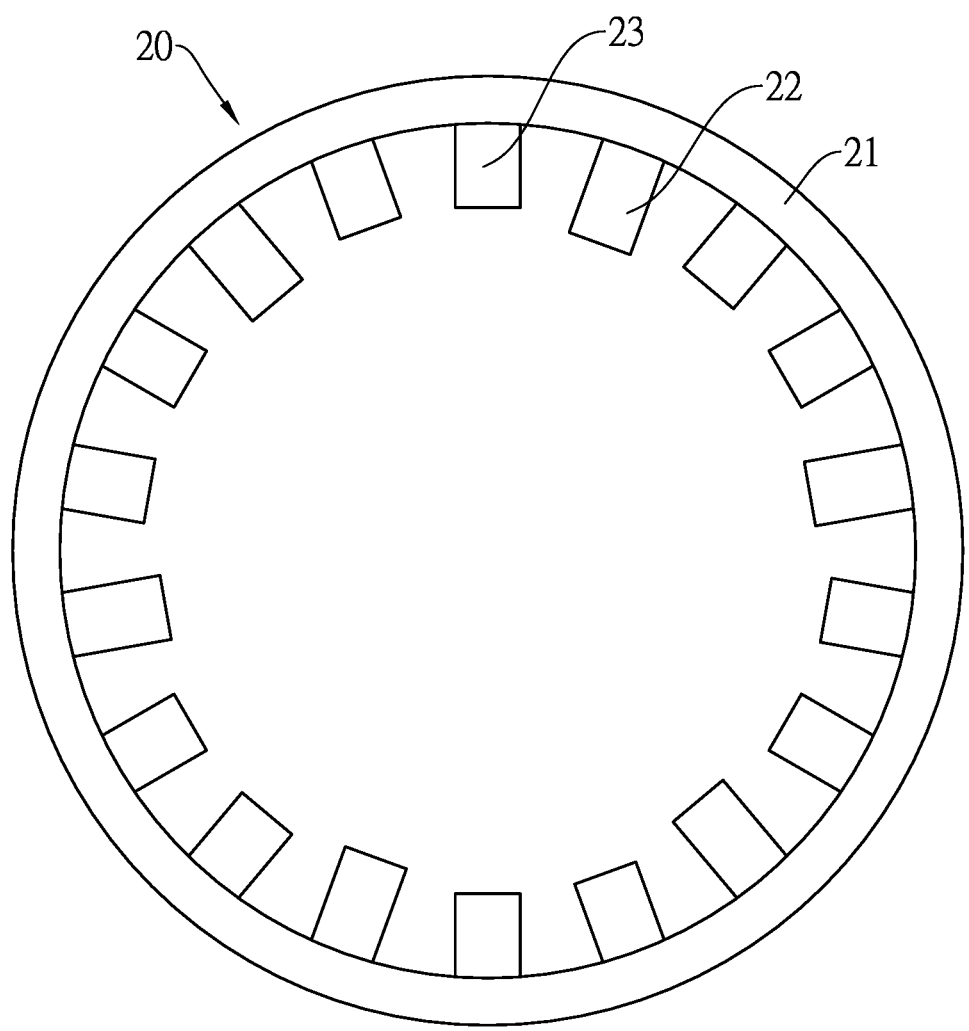
FIG. 3 is a side view of a restricting element of the tube connector in FIG. 1.

The restricting element 20 is mounted in a position of the second abutting surface 122 of the inner annular space 120 of the mounting segment 12. A hole surrounded by free ends of the first restricting teeth 22 and a hole surrounded by free ends of the second restricting teeth 23 are smaller than the tube body 40 in diameter. With reference to FIGS. 3 and 4, in a preferred embodiment, an amount of the second restricting teeth 23 is twice an amount of the first restricting teeth 22. That is, there are two second restricting teeth 23 located between any two adjacent first restricting teeth 22.

The teeth (the first restricting teeth 22 and the second restricting teeth 23) of the restricting element 20 are inclined toward a central line of the restricting element 20, and are inclined toward a direction away from the opening 11.

The sealing ring 30 is hollow and is mounted in the inner annular space 120 of the mounting segment 12. Two sides of the sealing ring 30 abut the first abutting surface 121 and the annular segment 21 of the restricting element 20 respectively.

Figure 5:
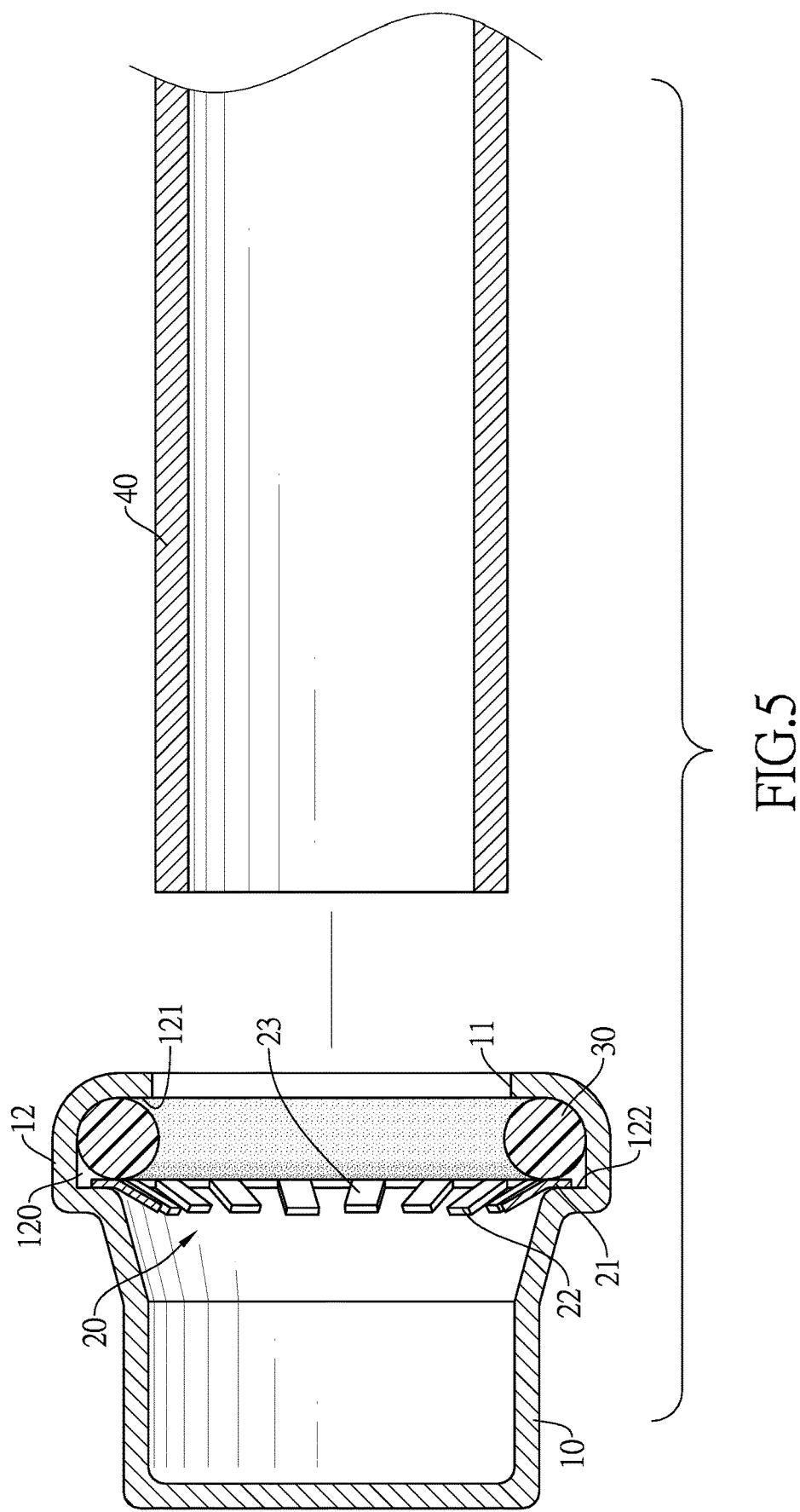
FIGS. 5 and 6 are front views in partial section of the tube connector in FIG. 1, shown assembled with a tube body.
Figure 6:
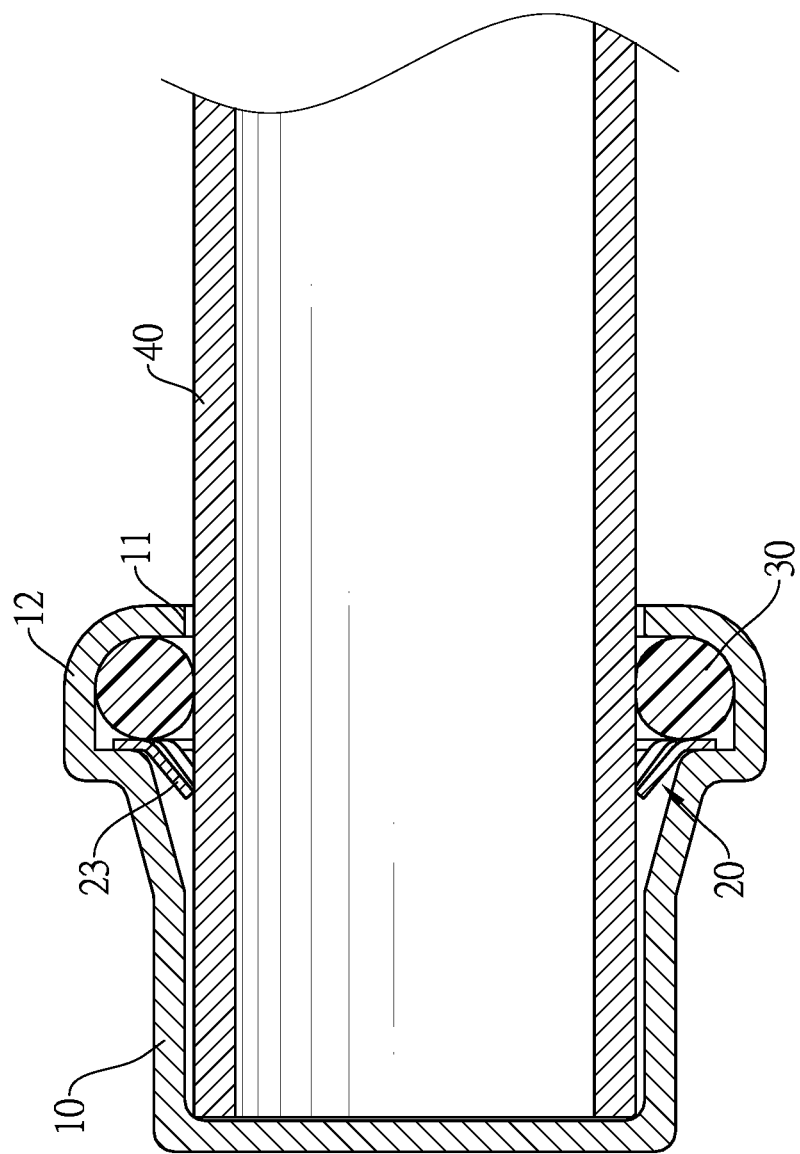
Figure 7:
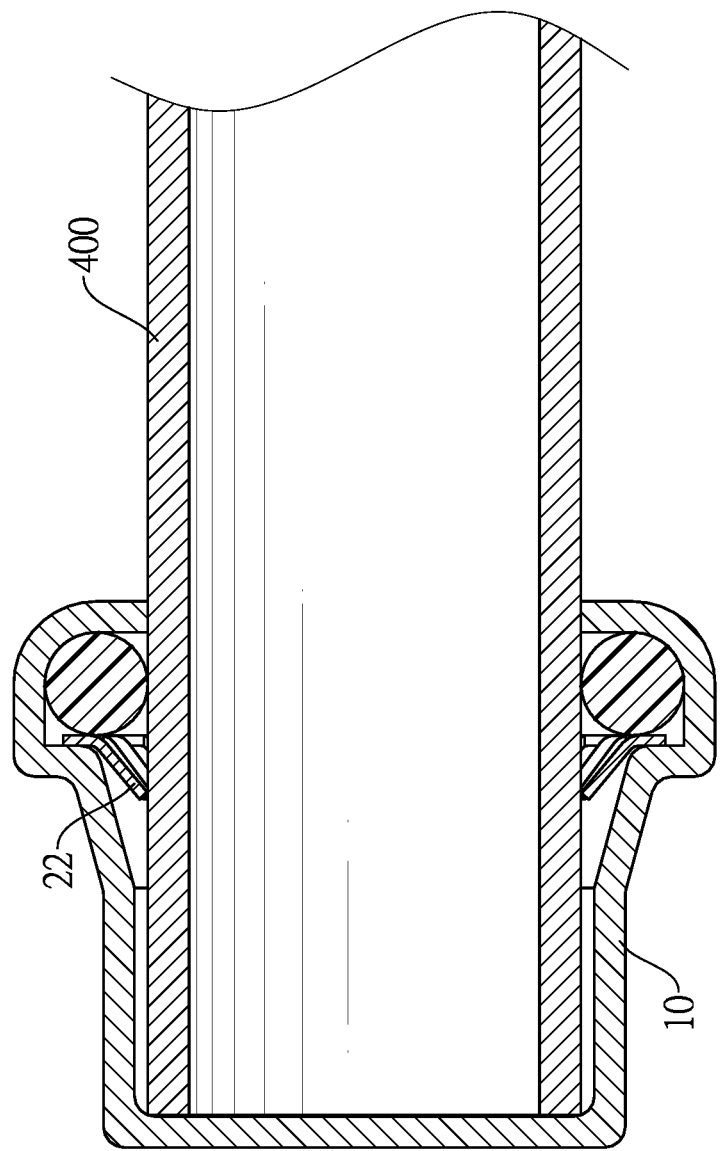
FIG. 7 is a front view in partial section of the tube connector in FIG. 1, shown assembled with a smaller tube body.

With reference to FIGS. 5 and 6, when the present invention is assembled with one single tube body 40, the tube body 40 is inserted into the opening 11 of the main body 10, and is mounted through the sealing ring 30 and the restricting element 20. The teeth (the first restricting teeth 22 and the second restricting teeth 23) of the restricting element 20 are abutted by the outer wall of the tube body 40 to be braced. After the tube body 40 is assembled and positioned, free ends of the teeth (the first restricting teeth 22 and the second restricting teeth 23) of the restricting element 20 abut the outer wall of the tube body 40 to engage and position the tube body 40. A tube diameter of the tube body 400 as shown in FIG. 7 is slightly smaller than a tube diameter of the tube body 40 as shown in FIG. 6. That is, the exact diameter of the tube body 400 still lies within the range of the tolerance, and the tube body 400 shown in FIG. 7 still can be engaged and positioned by the free ends of the teeth (the first restricting teeth 22 and the second restricting teeth 23).

With reference to FIG. 6, when the fluid is transported in the tube body 40, the pressure of the fluid in the main body 10 and the tube body 40 will change during the transportation of the fluid, and thus the main body 10 and tube body 40 are relatively moved. Therefore, the restricting element 20, which abuts the tube body 40, will abut the sealing ring 30 tightly or slightly to and fro, thereby maintaining the elasticity of the sealing ring 30 and avoiding the sealing ring from under the same force for a long time, which may cause elastic fatigue.

When the fluid pressure in the tube body 40 is larger, the pushing force generated by the fluid pressure of the annular segment 21 to the sealing ring 30 is larger as well, thereby enhancing the sealing.

Figure 8:
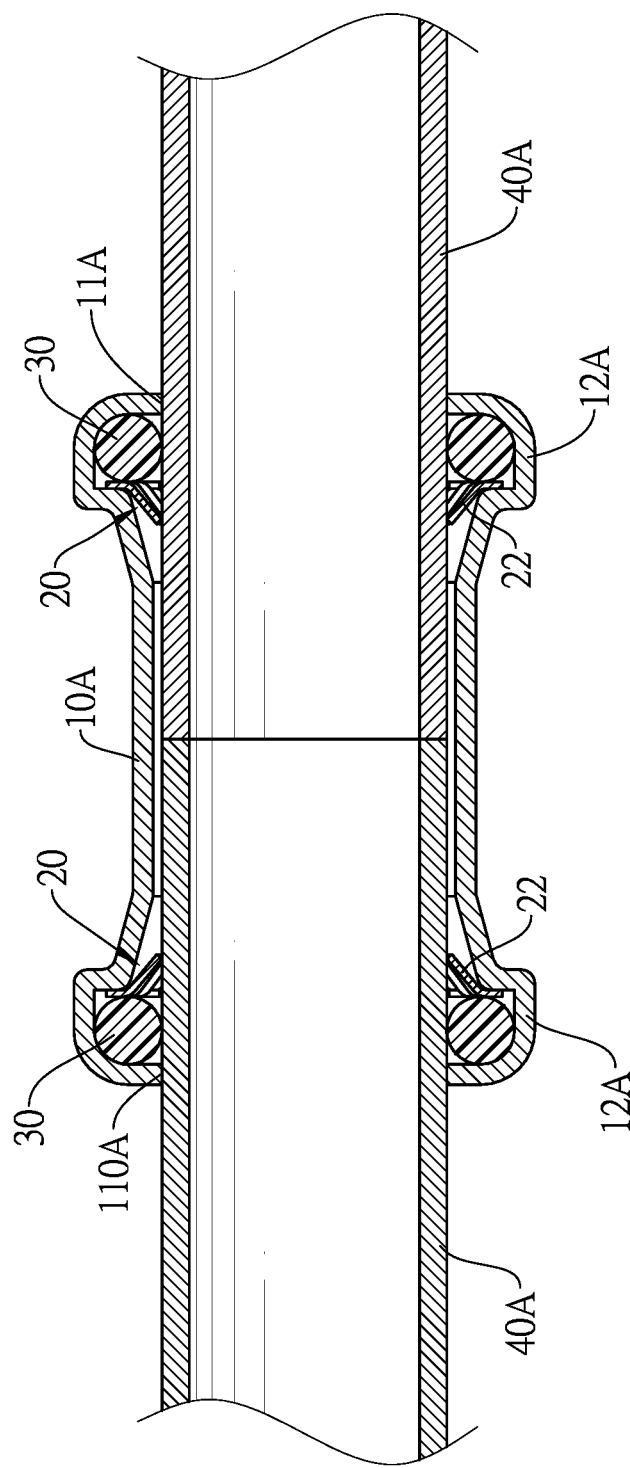
FIG. 8 is a front view in partial section of a second embodiment of a tube connector in accordance with the present invention, shown assembled with two tube bodies.

With reference to FIG. 8, which shows a second embodiment of the tube connector, the second embodiment is similar to the abovementioned first embodiment, but the second embodiment is for connecting two tube bodies. The detailed structural differences between the first embodiment and the second embodiment are as follows.

In the second embodiment, two ends of the main body 10A respectively form an opening 11A, 110A, and the two openings 11A, 110A communicate with each other. The main body 10A has two mounting segments 12A respectively adjacent to the two openings 11A, 110A. Same with the first embodiment, inside of each mounting segment 12A, there are a restricting element 20 and a sealing ring 30. In other words, there are two restricting elements 20 and two sealing rings 30 in total in the second embodiment.

When the second embodiment is in use, the two tube bodies 40A are respectively inserted into the two openings 11A, 110A to be inserted into the main body 10A. The two tube bodies 40A are respectively mounted through the two mounting segments 12A, and thus each of the tube bodies 40A is mounted through the sealing ring 30 and the restricting element 20 in the corresponding mounting segment 12A. The teeth of the restricting element 20 still can engage and position the tube body 40A.

The changing pressure of the fluid in the main body 10A and the tube body 40A still moves the main body 10A and tube body 40A relatively, and thus the sealing ring 30 is abutted tightly or slightly to and fro, thereby maintaining the elasticity of the sealing ring 30.

Figure 9:
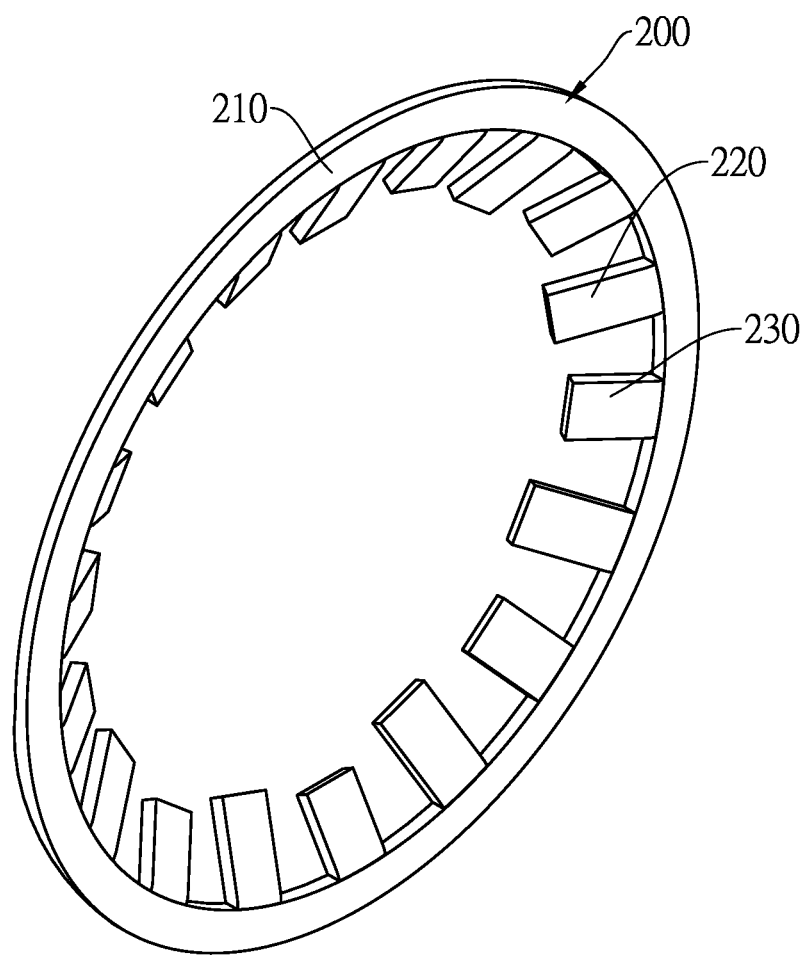
FIG. 9 is a perspective view of another embodiment of the restricting element of the tube connector in FIG. 1.
Figure 10:
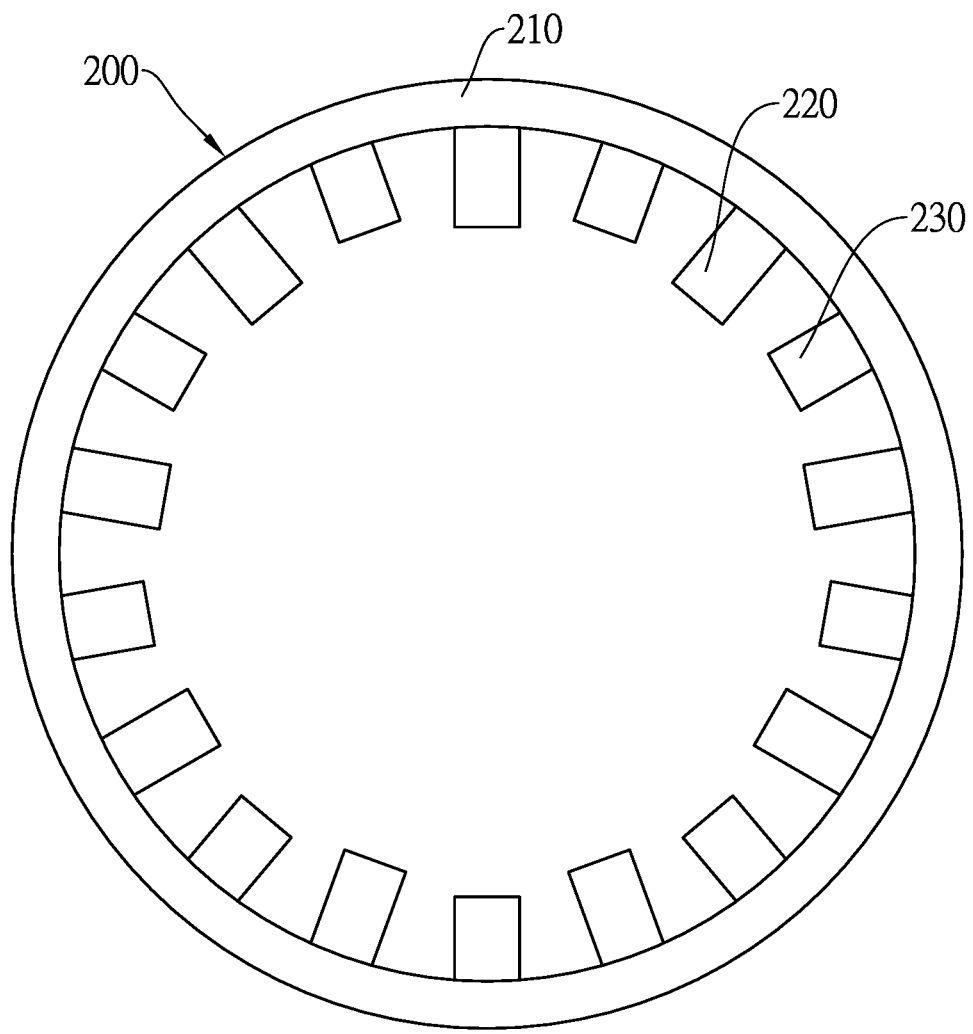
FIG. 10 is a side view of FIG. 9.
Figure 11:
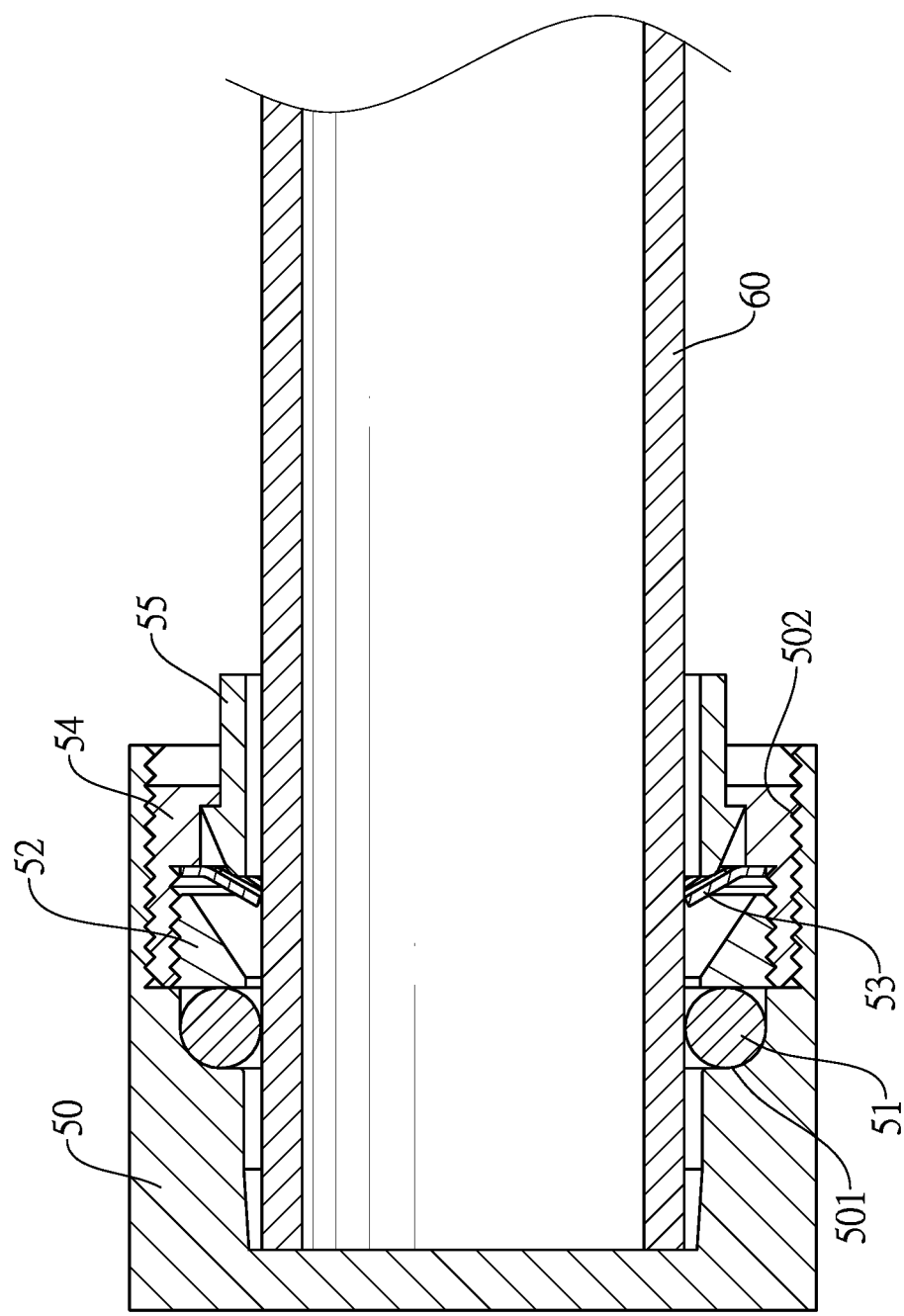
FIG. 11 is a front view in partial section of a conventional tube connector in accordance with the prior art.

With reference to FIGS. 9 and 10, which show another embodiment of the restricting element 200, in this preferred embodiment, the restricting element 200 is similar to the abovementioned preferred embodiment but an amount of the second restricting teeth 230 is equal to an amount of the first restricting teeth 220. The first restricting teeth 220 and the second restricting teeth 230 are annularly arranged in a staggered manner around the annular segment 210.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A tube connector comprising:
    a main body being hollow and having
        two ends opposite to each other; one of the two ends of the main body forming an opening, and the other end of the main body being a sealing end; and
        a mounting segment being adjacent to the opening, and extending outwardly and transversely to form
            an inner annular space inside of the mounting segment, communicating with the opening, and having
                an annular surrounding wall;
                a first abutting surface connected to one of two sides of the annular surrounding wall, being annular, and surrounding the opening; and
                a second abutting surface connected to the other side of the annular surrounding wall and being annular;
    a restricting element being a hollow and annular sheet, mounted in the inner annular space of the mounting segment, and having
        an annular segment abutting the second abutting surface; and
        multiple teeth protruding from an inner edge of the annular segment, and annularly spaced apart from each other; and
    a sealing ring being hollow, mounted in the inner annular space of the mounting segment, and abutting between the first abutting surface and the annular segment of the restricting element.

2. The tube connector as claimed in claim 1, wherein the teeth include multiple first restricting teeth and multiple second restricting teeth, and a protruding distance from the annular segment of the first restricting teeth is larger than a protruding distance from the annular segment of the second restricting teeth.

3. The tube connector as claimed in claim 2, wherein an amount of the second restricting teeth is twice an amount of the first restricting teeth.

4. The tube connector as claimed in claim 2, wherein an amount of the second restricting teeth is equal to an amount of the first restricting teeth.

5. The tube connector as claimed in claim 1, wherein the teeth of the restricting element are inclined toward a central line of the restricting element, and are inclined toward a direction away from the opening.

6. The tube connector as claimed in claim 2, wherein the first restricting teeth and the second restricting teeth of the restricting element are inclined toward a central line of the restricting element, and are inclined toward a direction away from the opening.

7. A tube connector comprising:
    a main body being hollow and having
        two ends opposite to each other; each of the two ends of the main body forming an opening, and the two openings of the two ends of the main body communicating with each other; and
        two mounting segments being adjacent to the two openings respectively; each of the two mounting segments extending outwardly and transversely to form
            an inner annular space inside of the mounting segment, communicating with the corresponding opening, and having
                an annular surrounding wall;
                a first abutting surface connected to one of two sides of the annular surrounding wall, being annular, and surrounding the corresponding opening; and
                a second abutting surface connected to the other side of the annular surrounding wall and being annular;
    two restricting elements mounted in the two inner annular spaces of the two mounting segments respectively; each of the two restricting elements being a hollow and annular sheet, and having
        an annular segment abutting the second abutting surface of the corresponding mounting segment; and
        multiple teeth protruding from an inner edge of the annular segment, and annularly spaced apart from each other; and
    two sealing rings mounted in the two inner annular spaces of the two mounting segments respectively; each of the two sealing rings being hollow and abutting between the first abutting surface and the annular segment of the restricting element in the corresponding mounting segment.

8. The tube connector as claimed in claim 7, wherein in each of the two restricting elements, the teeth comprise multiple first restricting teeth and multiple second restricting teeth, and a protruding distance from the annular segment of the first restricting teeth is larger than a protruding distance from the annular segment of the second restricting teeth.

9. The tube connector as claimed in claim 8, wherein an amount of the second restricting teeth is twice an amount of the first restricting teeth.

10. The tube connector as claimed in claim 8, wherein an amount of the second restricting teeth is equal to an amount of the first restricting teeth.

11. The tube connector as claimed in claim 7, wherein in each of the two restricting elements, the teeth of the restricting element are inclined toward a central line of the corresponding restricting element, and are inclined toward a direction away from the corresponding opening.

12. The tube connector as claimed in claim 8, wherein in each of the two restricting elements, the first restricting teeth and the second restricting teeth of the restricting element are inclined toward a central line of the corresponding restricting element, and are inclined toward a direction away from the corresponding opening.

* * * * *